(12) United States Patent
Xiong

(10) Patent No.: US 6,958,996 B2
(45) Date of Patent: Oct. 25, 2005

(54) ROUTER WITH AUTOMATIC PROTOCOL CONFIGURATION AND METHODS OF USE

(75) Inventor: Bo Xiong, Fremont, CA (US)

(73) Assignee: Actiontec Electronics, Inc., Sunnyvale, CA (US)

( * ) Notice: Subject to any disclaimer, the term of this patent is extended or adjusted under 35 U.S.C. 154(b) by 0 days.

(21) Appl. No.: 10/117,928

(22) Filed: Apr. 5, 2002

(65) Prior Publication Data

US 2003/0189928 A1 Oct. 9, 2003

(51) Int. Cl.[7] .............................................. H04L 12/28
(52) U.S. Cl. ...................... 370/389; 370/254; 370/255; 370/395.2; 370/395.3; 370/395.5; 709/222; 709/227; 709/228; 709/250; 710/11; 710/105; 713/1; 713/2
(58) Field of Search ................................ 370/255, 257, 370/389, 254, 395.2, 395.3, 395.5; 709/222, 709/227, 228, 250; 710/11, 105; 713/1, 2

(56) References Cited

U.S. PATENT DOCUMENTS

| | | | |
|---|---|---|---|
| 5,586,117 A | 12/1996 | Edem et al. | |
| 5,594,721 A | 1/1997 | Pan | |
| 5,802,042 A * | 9/1998 | Natarajan et al. | 370/255 |
| 5,864,559 A * | 1/1999 | Jou et al. | 370/465 |
| 5,946,311 A | 8/1999 | Alexander, Jr. et al. | |
| 6,034,964 A | 3/2000 | Fukushima et al. | |
| 6,058,115 A | 5/2000 | Sawyer et al. | |
| 6,125,122 A | 9/2000 | Favichia et al. | |
| 6,195,359 B1 | 2/2001 | Eng et al. | |
| 6,205,148 B1 | 3/2001 | Takahashi et al. | |
| 6,289,377 B1 * | 9/2001 | Lalwaney et al. | 709/222 |
| 6,356,533 B1 | 3/2002 | Bruno et al. | |
| 6,445,716 B1 | 9/2002 | Favichia et al. | |
| 2002/0004935 A1 * | 1/2002 | Huotari et al. | 717/11 |
| 2003/0061321 A1 * | 3/2003 | Roh | 709/222 |

* cited by examiner

Primary Examiner—Alpus H. Hsu
Assistant Examiner—Justin M. Philpott
(74) Attorney, Agent, or Firm—Fish & Neave IP Group Ropes & Gray LLP; Norman H. Beamer; Chi-Hsin Chang

(57) ABSTRACT

A router is provided that automatically configures itself to support Dynamic Host Configuration Protocol (DHCP) or Point-to-Point Protocol over Ethernet (PPPoE) communication protocols or other suitable communication protocols such as static IP, as required by an internet service provider. A user at a personal computer that is connected to the router via a local area network need not manually supply configuration information to the router for this purpose. The router may detect which communication protocol is to be used by monitoring which client set-up processes are initiated by the personal computer and by attempting to use those processes to communicate with the internet service provider. Successful responses from the internet service provider are used to confirm which protocol the router is to use for supporting subsequent communications between the personal computer and the internet service provider.

20 Claims, 7 Drawing Sheets

DHCP CLIENT SET-UP PROCESS

1. DHCP SERVER DISCOVER

2. DHCP SERVER SENDS OFFER

3. DHCP REQ (SPECIFIC FOR THE SERVER)
   -CONTAINS DOMAIN NAME AND HOST ID

4. DHCP SERVER CHECKS-
   IF CORRECT- SEND REPLY INCLUDING
     IP ADDRESS, GATEWAY IP ADDRESS, AND DNS
   IF INCORRECT-REJECT

FIG. 3

PPPoE CLIENT SET-UP PROCESS

1. PPPoE DISCOVER

2. PPPoE OFFER

3. PPPoE SESSION REQUEST

4. PPPoE SERVER SESSION CREATED

4a. LCP

4b. AUTHENTICATION

4c. IPCP

FIG. 4

ROUTER WITH AUTOMATIC PROTOCOL CONFIGURATION AND METHODS OF USE

BACKGROUND OF THE INVENTION

This invention relates to computer networks, and more particularly, to automatically configuring routers.

Home and small-office networking is increasingly popular. Users may connect personal computers to form local area networks in the home or office. By networking, users may communicate between computers and may share resources such as printers and broadband connections.

Although web-based interfaces have simplified the set-up process somewhat, users may still face difficulties when installing a router. After a user has made all required physical connections between the personal computers and peripherals in the user's network and a router, a typical web-based set-up procedure for the router will require the user to launch an internet browser and enter an internet protocol (IP) address that has been provided by the router manufacturer. A server implemented on the router will then provide the user with a web page that allows the user to enter user-specific configuration information for the router.

For example, when setting up the user's broadband connection, the user must typically enter user-specific configuration information that allows the router to be configured properly to work with the user's internet service provider. Such information may, for example, include authentication information such as a username and password or host identifier (ID) and domain name. The user may also enter information that informs the router of what type of modem technology the user has (e.g., a cable modem or a digital subscriber line (DSL) modem).

The router may be configured based on the user-supplied information. However, set-up information that is gathered from the user in this way may not always be sufficiently accurate to ensure that the router uses the correct communication protocol to communicate with the user's internet service provider (ISP). This is because not all internet service providers that provide their subscribers with DSL modems operate using the same protocols and not all internet service providers that provide their subscribers with cable modems operate using the same protocols. Merely specifying that the user has one type of modem or the other is not a completely accurate method of ensuring that the appropriate service provider communication protocol is used by the router to communicate with the ISP.

Moreover, it would be desirable to minimize or eliminate the need for the user to enter any information at all using the web-based set-up screen. Ideally, the user would not need to know anything technical about their set-up such as what type of communication protocol is used by their internet service provider or what type of modem technology they are using. This type of plug-and-play arrangement would make installing and configuring the router easier for the average user and would therefore minimize requirements for customer support on the part of the router manufacturer and internet service providers.

It is therefore an object of the present invention to provide a router that has automatic configuration capabilities.

SUMMARY OF THE INVENTION

This and other objects of the invention are accomplished in accordance with the present invention by providing an automatically configuring router. The router has a processor that monitors the communication protocol that is being used by a personal computer in attempting to connect to an internet service provider. The processor determines whether that communication protocol is the correct protocol to use to support communications with the internet service provider, and, if the protocol is correct, the processor stores information identifying the protocol in memory for the router to use in supporting subsequent communications between the personal computer and internet service provider.

Initially, a home or office user may connect the router at a suitable network location. For example, the user may connect the router at a point located between a local area Ethernet network and a shared broadband modem. The physical connections between the personal computers in the local area network and the router may be wireless links (e.g., IEEE 802.11(b) links), may be universal serial bus (USB) links, may be based on standard Ethernet cables and links, or may be based on any suitable link technology.

Depending on the type of communication protocols used by the user's internet service provider (ISP) and the user's modem, the router may need to communicate using different communication protocols. For example, a user of a DSL service may have an ISP that uses the Point-to-Point Protocol over Ethernet (PPPoE) protocol for internet communications, whereas a user of a cable modem service may have an ISP that uses the Dynamic Host Configuration Protocol (DHCP) protocol for internet communications. As another example, a user of a DSL service may have an ISP that requires the use of the DHCP protocol for internet communications. DSL and cable modem services may also be provided by ISPs that require the use of an internet communication protocol based on static IP addressing.

After the user has made the necessary physical connections between the router and the rest of the network elements, the user may initiate broadband communications. For example, the user may boot up a personal computer on the network and may launch an internet browser.

When the personal computer boots up, the personal computer and the router establish a communications link. For example, the personal computer can use the DHCP protocol that is embedded in the Windows operating system. During the DHCP client set-up process, the router will provide the personal computer with information on the appropriate IP address, gateway IP address, and domain name server for the personal computer and router to communicate with each other. The router may then obtain authentication information for use in logging on to the internet through the user's ISP. The router may obtain this information using a web-based set-up screen or by negotiating with the personal computer to obtain the authentication information.

After the personal computer has been successfully booted up, the user may launch a web browser or other software to connect to the internet. The user may or may not have previously set up the personal computer's internet communication protocols correctly. For example, the user may have correctly installed a PPPoE client for communications over a DSL modem with an ISP that requires that internet communications use PPPoE protocols or may have incorrectly installed a PPPoE client on the personal computer even though the user's ISP uses the DHCP protocol. Regardless of whether the user has properly set up the personal computer, the router may automatically detect the appropriate communication protocol to use. Because the router performs this set-up task automatically without user intervention, it is not necessary to require the user to enter this set-up information in the initial configuration web page. This simplifies the set-up process, increases accuracy, and may allow the router to be configured without a configuration web page.

Further features of the invention, its nature and various advantages will be more apparent from the accompanying drawings and the following detailed description.

BRIEF DESCRIPTION OF THE DRAWINGS

FIG. 3 is a diagram of an illustrative DHCP set-up process in accordance with the present invention.

FIG. 4 is a diagram of an illustrative PPPoE set-up process in accordance with the present invention.

DETAILED DESCRIPTION

Figure 1:
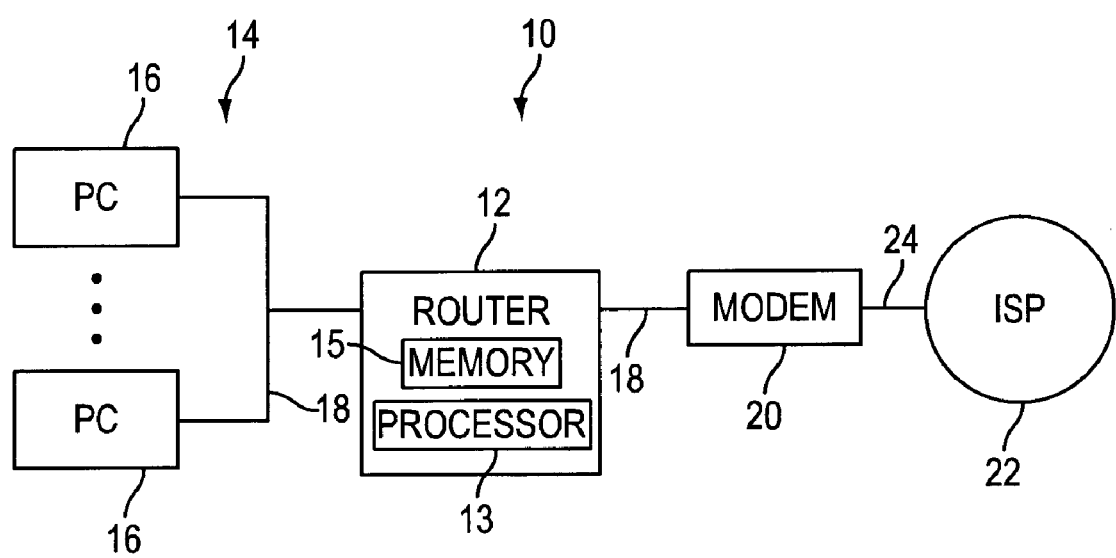
FIG. 1 is a schematic diagram of an illustrative system using a router in accordance with the present invention.

An illustrative system 10 in which a router 12 in accordance with the present invention may be used is shown in FIG. 1. Router 12 may have a processor 13 (e.g., a microprocessor or one or more other suitable processors) and memory 15. System 10 may include a local area network 14 that has one or more personal computers 16 and other network elements (e.g., peripherals such as printers and storage devices). Local area network 14 may be located in a user's home or office or any other suitable location in which it is desired to interconnect network elements.

Personal computers 16 may be, for example, personal computers running the Windows operating system or any other suitable computers. Personal computers 16 and other network elements in local area network 14 may be interconnected by communications links 18 that are based on Ethernet cables, universal serial bus cables, wireless paths (e.g., paths based on the IEEE 802.11(b) standard) or any other suitable network links. Router 12 and modem 20 may also be connected to local area network 14 using links 18. Modem 20 may be, for example, a broadband modem such as a cable modem or a digital subscriber line (DSL) modem. Modem 20 may be connected to internet service provider (ISP) 22 by communications path 24. Router 12 uses modem 20 to communicate with ISP 22 and therefore to support communications between personal computers 16 in network 14 and ISP 22. Communications path 24 may be, for example, a cable or telephone path. ISP 22 acts as a gateway to the internet.

When one of personal computers 16 boots up, communications between that personal computer 16 and router 12 may be established. As shown on the personal computer side of FIG. 2, when the computer boots up the computer's BIOS may be automatically run (step 24). This loads and runs the computer's operating system (e.g., Windows or any other suitable operating system) at step 26. Once the operating system is running, the operating system automatically detects the presence of network communications hardware such as an Ethernet card at step 28. A TCP/IP stack on the personal computer (e.g., the TCP/IP stack that is built into Windows) may then be used to support IP traffic on link 18, as shown by step 30. To set up communications between the personal computer and router 12, the personal computer's client software (e.g., a DHCP or PPPoE client) may then run a client setup process, at step 32. For example, the default client set-up process for step 32 may be based on the DHCP protocol, which is embedded in the Windows operating system and therefore cannot be removed.

Figure 2:
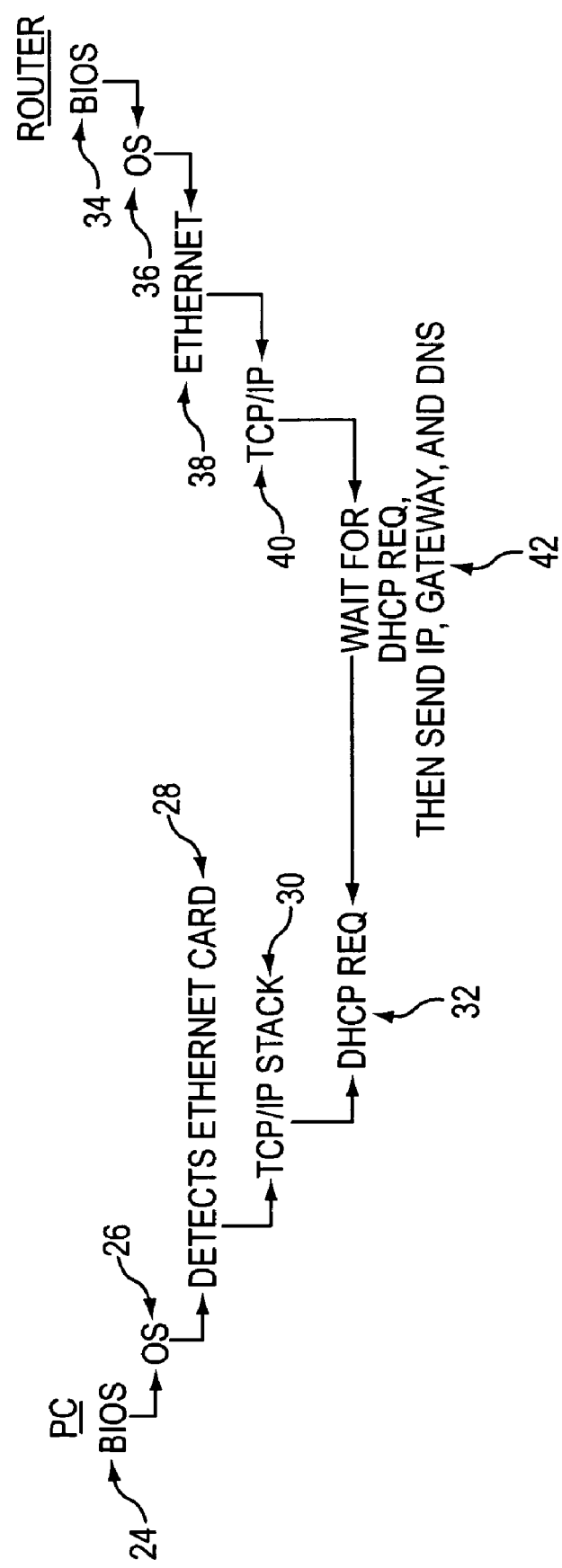
FIG. 2 is a diagram showing steps involved in setting up communications between a personal computer and the router in accordance with the present invention.

As shown in FIG. 2, the processor in router 12 follows a boot-up procedure that is similar to that of personal computer 16. The BIOS of the router is run at step 34, which loads the operating system for the router at step 36. The Ethernet communications and TCP/IP communications capabilities of the router are shown as being enabled at steps 38 and 40. At this stage, a DHCP server application implemented on router 12 waits for a DHCP request from the personal computer (step 42). When a DHCP REQ command is received, the router sends an IP address (i.e., the IP address assigned to the personal computer), a gateway IP address (i.e., the IP address of the router acting as a gateway), and domain name server (DNS) address information (a domain name server is a server that stores information for translating web addresses such as www.yahoo.com into IP addresses). When the personal computer receives this information, a communications link is established and the personal computer and router may then rest in an idle state until further activity is initiated.

Such further activity may result, for example, when a user at the personal computer launches a browser or otherwise attempts to use software on the personal computer to communicate with ISP 22 (e.g., to retrieve information from the internet).

When the user initially sets up the router, the router may provide the user with a web-page interface. The user may reach the web-page interface by entering an IP address that the router manufacturer provides to the user. The web-page interface allows the user to provide authentication information (e.g., username and password information or domain name and host ID information) to the router that the router can store for later use in connecting to ISP 22. If the router stores the user authentication information in this way, other users on local area network 14 need not know the appropriate authentication information to use when establishing communications with ISP and the initial or primary user need not repeatedly supply this information to router 12.

If desired, the router may automatically negotiate with the personal computer to obtain the authentication information, thereby obviating the need for a web-page interface. Details of a suitable automatic method for obtaining user authentication information for the router are provided in commonly-assigned copending application Ser. No. 10/104,737, filed Mar. 20, 2002, entitled "Information Routine Device Having An Auto-configuration Feature," which is hereby incorporated by reference herein in its entirety.

During operation, router 12 acts as a server for client requests from the personal computers 16 of local area network 14. Router 12 retransmits client requests from each personal computer 16 to ISP 22 in real time. In this capacity, router 12 acts as a client that submits requests to the ISP gateway server. When the ISP server delivers data to the client application on the router, the router passes this information along to the personal computer (acting, in this capacity, as a server for the personal computer client).

Effective operation of router 12 in passing communications between personal computer 16 and ISP 22 is the use of the proper communication protocol. Although different ISPs use different protocols, each ISP will generally only support the use of one protocol for the users attached to that ISP. Typical ISPs for DSL modem users use the PPPoE protocol, although such ISPs may also use the DHCP protocol. Typical cable modem ISPs use DHCP, although such ISPs may also use PPPoE. Other protocols may also be supported. For example, older DSL and cable modem ISPs may use static IP addressing.

In accordance with the present invention, router 12 can automatically detect the appropriate protocol to use to communicate with ISP 22. For clarity, the present invention will focus on illustrative examples where ISP 22 is using either DHCP or PPPoE. It will be appreciated, however, that the present invention also applies to ISPs that use the static IP protocol or other suitable communication protocols.

To establish communications between a client and a server using DHCP or PPPoE, an appropriate DHCP or PPPoE set-up process must be successfully completed.

Steps involved in the DHCP client set-up process are shown in FIG. 3. At step 1 of FIG. 3, a DHCP server discover step is performed. In essence, the client requests an offer from an available server (i.e., queries whether any working servers are present). If an available DHCP server receives the client request of step 1, the DHCP server issues an offer to the client at step 2. At step 3, the client then responds by issuing a DHCP request to the server of step 2. The DHCP request contains the domain name and host ID information that is needed for authentication. At step 4, the DHCP server checks to see if the client is authorized. If the domain name and host ID information are correct, the DHCP server sends a reply that includes an IP address for the client (i.e., the client's IP address for receiving communications), a suitable gateway IP address, and DNS address information. If the domain name and host ID information are not correct, the DHCP server rejects the request of step 3. (The steps of FIG. 3 are the steps involved with steps 32 and 42 of FIG. 2).

Steps involved in the PPPoE client set-up process are shown in FIG. 4. At step 1, the PPPoE client performs a discover process, seeking available servers. More than one PPPoE server may respond with a PPPoE offer at step 2. At step 3, the client makes a PPPoE session request, which includes information identifying a particular PPPoE server that is being requested from all of the available servers. During step 4 of FIG. 4, a PPPoE server session may be created. First, at step 4a, data link set up steps are performed by the client and server using the LCP protocol portion of the PPP protocol suite. For example, parameters such as checksum method (for example, FCS), maximum receive unit (MRU), and packet size are established. After successful completion of step 4a, the PPP authentication process is performed using the authentication information and appropriate protocols (PAP, CHAP, MS-CHAP, EAP, SPAP). If authentication step 4b is not successful, the PPPoE client set-up process and the entire session terminate. If authentication step 4b is successful, the IPCP process is performed at step 4c. During the IPCP process, communications parameters such as IP address, gateway IP address, and DNS information are provided to the client.

Router 12 and personal computer 16 may communicate following a set-up procedure of the type shown in FIG. 2. To support communications between personal computer 16 and ISP 22, router 12 must know which communication protocol is to be used by router 12 to support communications between router 12 and ISP 22. As an illustrative example, this protocol might be either DHCP or PPPoE. In accordance with the present invention, the router 12 may automatically determine which protocol to use by monitoring communications from the personal computer 16, by attempting to communicate with ISP 22 using the same protocol or protocols used by the personal computer 16, and by observing the results of these attempts. When the router 12 successfully communicates with the ISP 22, the router thereafter "knows" that the communication protocol that was used is the correct one. Information on which communication protocol was successful may be stored in the memory 15 in the router (if desired) and used to support subsequent communications between personal computer 16 and ISP 22.

In the present illustrative example, ISP 22 may be the type of ISP that requires the use of the DHCP protocol or the type of ISP that requires the use of the PPPoE protocol. The user may or may not have installed the correct client software on personal computer 16 to support communications using the correct protocol. The user may, for example, have downloaded third-party software that installed a PPPoE client when a DHCP client should have been used or vice versa. As a result, there are several possible scenarios that should be handled by the router 12.

Figure 5:
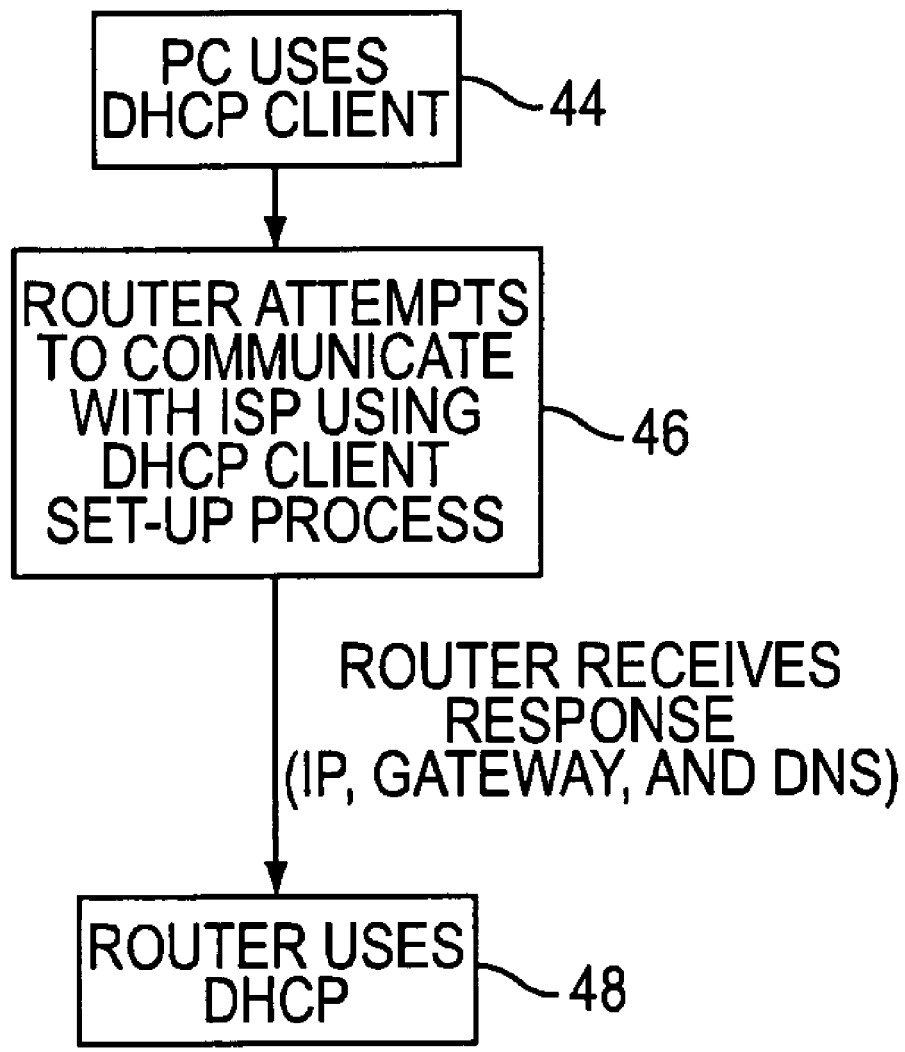
FIG. 5 is a flow chart of illustrative steps involved in using a router in accordance with the present invention to form an internet communications link between a personal computer that uses only a DHCP client and an ISP that requires use of the DHCP protocol.

One possible situation is that the internet service provider protocol is DHCP and the user at the personal computer uses only a DHCP client (e.g., the DHCP client that is embedded within Windows). As shown by step 44 of FIG. 5, the user may initiate communications using the DHCP client set-up process (i.e., the process of FIG. 3). For example, the user may launch a web browser that attempts to retrieve a web page after using the DHCP client. This attempt is detected by router 12. Because the router detected DHCP communications, at step 46 the router also attempts to communicate with ISP 22 using the DHCP client set-up process of FIG. 3. The ISP 22 uses DHCP (in the scenario of FIG. 5), so following successful authentication by ISP 22, the router receives IP, gateway, and DNS information from the ISP server and thereafter uses DHCP to support internet communications between personal computer 16 and ISP 22. Information identifying DHCP as the correct protocol to use may be stored in memory 15 by processor 13.

Figure 6:
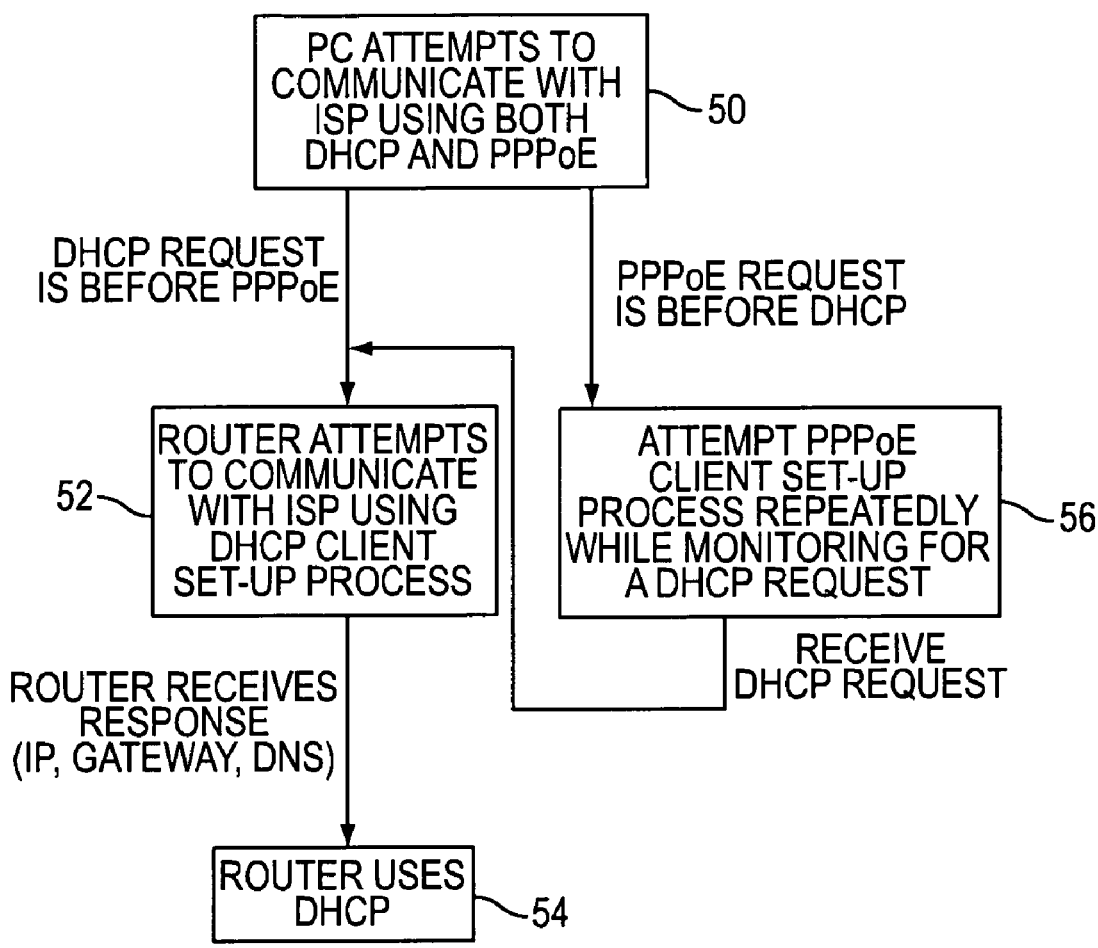
FIG. 6 is a flow chart of illustrative steps involved in using a router in accordance with the present invention to form an internet communications link between a personal computer that uses both DHCP and PPPoE protocols and an ISP that requires use of the DHCP protocol.

Another situation is shown by the steps of FIG. 6. In the scenario of FIG. 6, the internet service provider protocol required by ISP 22 is DHCP, but the personal computer 16 attempts to communicate using both DHCP and PPPoE (e.g., due to the use of mistakenly loaded PPPoE software). As shown by step 50, personal computer 16 attempts to communicate with ISP 22 using both DHCP and PPPoE. If the DHCP request (the DHCP set-up process of FIG. 3) is received before the PPPoE request (the PPPoE set-up process of FIG. 4), the router attempts to communicate with ISP 22 using DHCP at step 52. Because ISP 22 uses DHCP (in the scenario of FIG. 6), the router receives a response including IP, gateway, and DNS information. Successful receipt of this information is confirmation that the ISP supports DHCP, so the router thereafter uses DHCP to communicate with ISP 22 at step 54. Information identifying DHCP as the correct protocol to use may be stored by processor 13 in memory 15.

If the PPPoE request occurs before the DHCP request, the router repeatedly attempts (unsuccessfully) to set up communications with ISP 22 at step 56 (using the PPPoE set-up process of FIG. 4), while monitoring link 18 with personal computer 16 for DHCP requests. When a DHCP request is received, control passes to step 52 and DHCP communications are established and thereafter used by router 12 at step 54. Information identifying DHCP as the correct protocol to use may be stored in memory 15 by processor 13.

Figure 7:
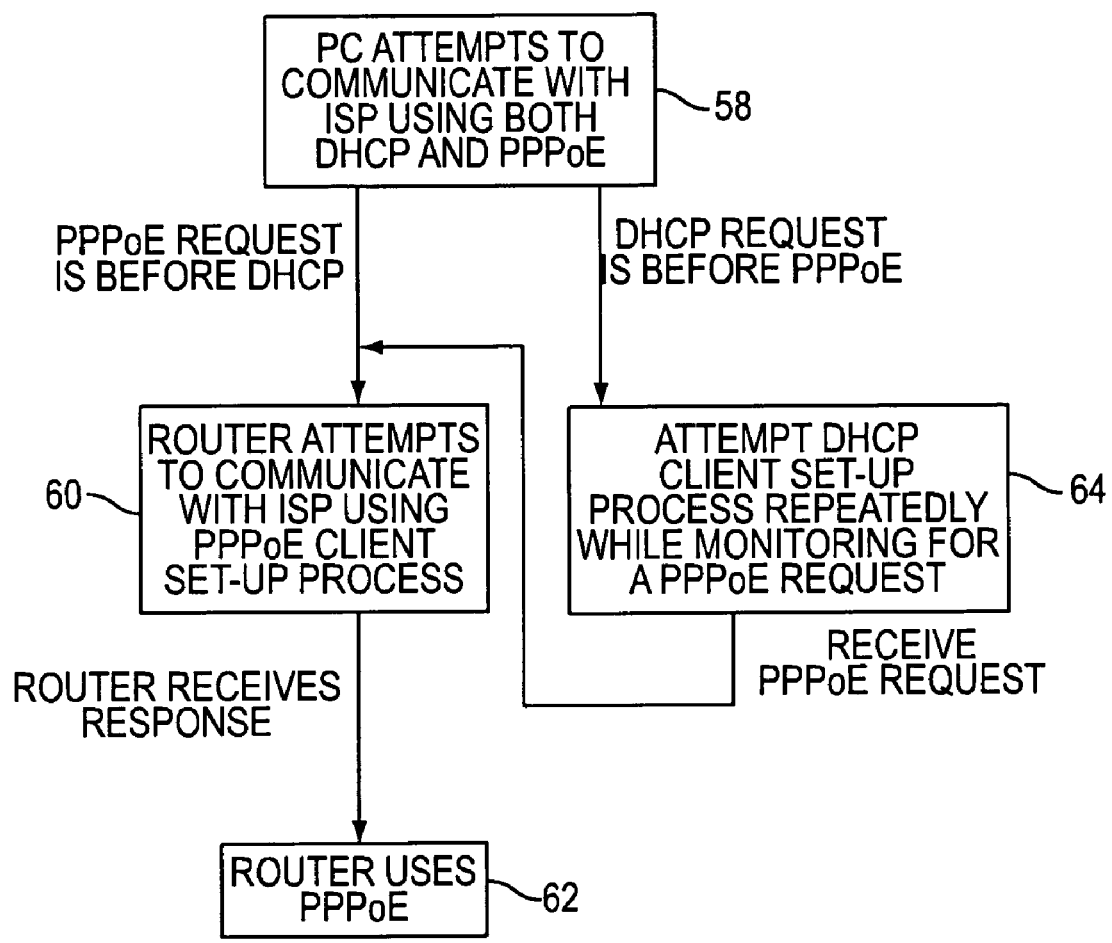
FIG. 7 is a flow chart of illustrative steps involved in using a router in accordance with the present invention to form an internet communications link between a personal computer that uses both DHCP and PPPoE protocols and an ISP that requires use of the PPPoE protocol.

The internet service provider may require the use of the PPPoE protocol. The behavior of router 12 in this scenario is illustrated in FIG. 7. At step 58, personal computer 16 may attempt to communicate with ISP 22 using both DHCP and PPPoE. If the PPPoE request is received before the DHCP request, at step 60 router 12 attempts to communicate with ISP 22 using the PPPoE client set-up process of FIG. 4. Because the ISP 22 uses PPPoE (in the scenario of FIG. 7), the router receives a response including IP, gateway, and DNS information from the server at the ISP, which confirms that the ISP is using PPPoE. The router 12 may thereafter use PPPoE in supporting communications between personal computer 16 and ISP 22. Information identifying PPPoE as the correct protocol to use may be stored in memory 15 by processor 13.

If the DHCP request is received before the PPPoE request, at step 64 the router 12 repeatedly attempts (unsuccessfully) to establish communications with ISP 22 using the DHCP client set-up process of FIG. 3, while monitoring link 18 between router 12 and personal computer 16 for a PPPoE request from personal computer 16. When a PPPoE request is received from personal computer 16 by router 12, router 12 attempts to establish communications with the ISP 22 using PPPoE at step 60 and, following a successful response, thereafter supports communications with ISP 22 using PPPoE at step 62. Information identifying PPPoE as the appropriate communication protocol to use for subsequent communications may be store by processor 13 in memory 15.

Although the scenarios described in connection with FIGS. 3–7 have used DHCP and PPPoE as protocols as an example, it will be appreciated that these protocols are merely illustrative. The router 12 may detect and use any suitable protocols required by ISP 22, including static IP, DHCP, PPPoE, and any other suitable protocols. Moreover, although the invention has been described in the context of a router 12 that is suitable for use in a home or small office environment, any other suitable communications equipment that supports local area network communications between a plurality of computers and peripherals such as printers and modems or other network elements may be used in place of router 12 if desired.

It will be understood that the foregoing is only illustrative of the principles of the invention and that various modifications can be made by those skilled in the art without departing from the scope and spirit of the invention. Many examples of such modifications have been given through the foregoing specification.

What is claimed is:

1. A method for automatically determining which internet service provider communication protocol to use to support communications between a personal computer and an internet service provider via a router, the method comprising:
   (a) receiving a request by the router from the personal computer to establish communications with the internet service provider;
   (b) automatically initiating configuration of the router responsive to receipt of the request;
   (c) employing the router to automatically determine which client set-up process protocol the personal computer is attempting to use in the request to establish communications with the internet service provider;
   (d) automatically attempting to establish communications between the router and the internet service provider using the client set-up process protocol determined in (c); and
   (e) if the client set-up process protocol determined in (c) is successful in establishing communications between the router and the internet service provider, storing information identifying the client set-up process protocol for subsequent use.

2. The method defined in claim 1 wherein the internet service provider protocol is selected from the group consisting of DHCP, PPPoE, and static IP.

3. The method defined in claim 1 wherein the internet service provider protocol is selected from the group consisting of DHCP and PPPoE.

4. The method defined in claim 1 further comprising using PPPoE to support communications between the personal computer and the internet service provider after the router receives IP, gateway, and DNS information from the internet service provider in response to attempting communications with the internet service provider using a PPPoE client set-up process.

5. The method defined in claim 1 further comprising using DHCP to support communications between the personal computer and the internet service provider after the router receives IP, gateway, and DNS information from the internet service provider in response to attempting communications with the internet service provider using a DHCP client set-up process.

6. A method for a router to automatically detect whether an internet service provider with which the router communicates requires the use of DHCP or requires the use of PPPoE, wherein the router is used to support communications between a personal computer that is connected to the router and the internet service provider using a modem, comprising:
   (a) monitoring communications from the personal computer to the router;
   (b) receiving a request by the router from the personal computer to establish communications with the internet service provider;
   (c) automatically initiating configuration of the router responsive to receipt of the request;
   (d) employing the router to automatically determine whether the personal computer is attempting to use DHCP or PPPoE communication protocol in the request to communicate with the internet service provider;
   (e) automatically attempting to establish communications with the internet service provider using the communication protocol determined in (d); and
   (f) determining whether the attempt of the router to communicate with the internet service provider is successful and, when the attempt of the router to communicate with the internet service provider is successful, using the successful communication protocol to support subsequent communications between the personal computer and the internet service provider.

7. The method defined in claim 6 wherein the modem is a cable modem and said same communication protocol is DHCP.

8. The method defined in claim 6 wherein the modem is a DSL modem and said same communication protocol is PPPoE.

9. The method defined in claim 6 wherein the modem is a DSL modem and said same communication protocol is DHCP.

10. A method for a router to automatically detect which communication protocol is used by an internet service provider with which the router communicates, wherein the communication protocol is selected from the group consisting of DHCP, PPPoE, and static IP, wherein the router is used to support communications between a personal computer that is connected to the router and the internet service provider using a modem, comprising:
   (a) monitoring communications from the personal computer to the router;
   (b) receiving a request by the router from the personal computer to establish communications with the internet service provider;
   (c) automatically initiating configuration of the router responsive to receipt of the request;
   (d) employing the router to automatically determine whether the personal computer is attempting to use DHCP, PPPoE, or static IP communication protocol in the request to communicate with the internet service provider;
   (e) automatically attempting to establish communication with the internet service provider using the communication protocol determined in (d); and
   (f) determining whether the attempt of the router to communicate with the internet service provider is successful and, when the attempt of the router to communicate with the internet service provider is successful, using the successful communication protocol to support subsequent communications between the personal computer and the internet service provider.

11. A method for using a router to automatically detect which internet service provider communication protocol to use to support communications between a personal computer that is connected to the router and an internet service provider with which the router communicates using a modem, comprising:
   (a) receiving a request by the router from the personal computer to establish communications with the internet service provider;
   (b) automatically initiating configuration of the router responsive to receipt of the request;
   (c) using the router to automatically monitor which client set-up process protocol the personal computer is attempting to use in the request to establish communications with the internet service provider;
   (d) automatically using the router to attempt to establish communications with the internet service provider using the client set-up process protocol monitored in (c); and
   (e) using the client set-up process protocol monitored in (c) as the internet service provider protocol for the router whenever the client set-up process protocol monitored in (c) is successful in establishing communications between the router and the internet service provider.

12. The method defined in claim 11 wherein the internet service provider protocol is selected from the group consisting of DHCP, PPPoE, and static IP.

13. The method defined in claim 11 wherein the internet service provider protocol is selected from the group consisting of DHCP and PPPoE.

14. The method defined in claim 11 further comprising using PPPoE to support communications between the personal computer and the internet service provider after the router receives IP, gateway, and DNS information from the internet service provider in response to attempting communications with the internet service provider using a PPPoE client set-up process.

15. The method defined in claim 11 further comprising using DHCP to support communications between the personal computer and the internet service provider after the router receives IP, gateway, and DNS information from the internet service provider in response to attempting communications with the internet service provider using a DHCP client set-up process.

16. A router that is configured to automatically determine which internet service provider communication protocol to use to support communications between a personal computer and an internet service provider, comprising:
   a processor; and
   memory, wherein the processor and memory are configured to:
   (a) receive a request from the personal computer to establish communications with the internet service provider;
   (b) automatically initiate configuration of the router responsive to receipt of the request;
   (c) automatically determine which client set-up process protocol the personal computer is attempting to use in the request to establish communications with the internet service provider;
   (d) automatically attempt to establish communications between the router and the internet service provider using the client set-up process protocol determined in (c); and
   (e) if the client set-up process protocol determined in (c) is successful in establishing communications between the router and the internet service provider, store information in the memory that identifies the client set-up process protocol for subsequent use.

17. The router defined in claim 16 wherein the internet service provider protocol is selected from the group consisting of DHCP, PPPoE, and static IP.

18. The router defined in claim 16 wherein the internet service provider protocol is selected from the group consisting of DHCP and PPPoE.

19. The router defined in claim 16, wherein the processor and memory are further configured to use PPPoE to support communications between the personal computer and the internet service provider after the router receives IP, gateway, and DNS information from the internet service provider in response to attempting communications with the internet service provider using a PPPoE client set-up process.

20. The router defined in claim 16 wherein the processor and memory are further configured to use DHCP to support communications between the personal computer and the internet service provider after the router receives IP, gateway, and DNS information from the internet service provider in response to attempting communications with the internet service provider using a DHCP client set-up process.

* * * * *